US011680750B1

(12) United States Patent
Gaportsin

(10) Patent No.: US 11,680,750 B1
(45) Date of Patent: Jun. 20, 2023

(54) SYSTEM AND METHOD FOR GREEN INTEGRATED ELECTRIC POWER PLANT

(71) Applicant: Iosif Gaportsin, Staten Island, NY (US)

(72) Inventor: Iosif Gaportsin, Staten Island, NY (US)

( * ) Notice: Subject to any disclaimer, the term of this patent is extended or adjusted under 35 U.S.C. 154(b) by 0 days.

(21) Appl. No.: 17/826,143

(22) Filed: May 26, 2022

(51) Int. Cl.
| | |
|---|---|
| F27D 17/00 | (2006.01) |
| H02J 3/38 | (2006.01) |
| H02S 10/12 | (2014.01) |
| F28D 21/00 | (2006.01) |

(52) U.S. Cl.
CPC ....... F27D 17/004 (2013.01); F28D 21/0014 (2013.01); H02J 3/381 (2013.01); H02S 10/12 (2014.12); H02J 2300/22 (2020.01); H02J 2300/28 (2020.01); H02J 2300/40 (2020.01)

(58) Field of Classification Search
None
See application file for complete search history.

(56) References Cited

U.S. PATENT DOCUMENTS

| | | | |
|---|---|---|---|
| 4,016,725 A | 4/1977 | Fiss | |
| 4,452,046 A | 6/1984 | Valentin | |
| 4,508,973 A | 4/1985 | Payne | |
| 7,453,167 B2 | 11/2008 | Gilbert | |
| 7,735,483 B2 * | 6/2010 | Papageorgiou | F03G 6/045 52/2.21 |
| 8,397,505 B2 * | 3/2013 | Penciu | F03G 6/065 126/690 |
| 8,482,148 B2 * | 7/2013 | Kobayashi | F03G 6/045 290/55 |
| 10,876,519 B1 | 12/2020 | Chaapel | |
| 11,015,578 B2 | 5/2021 | Menges | |
| 2009/0212570 A1 * | 8/2009 | Le | F03D 9/28 60/641.15 |

(Continued)

FOREIGN PATENT DOCUMENTS

| | | | |
|---|---|---|---|
| CN | 102787981 A | * | 11/2012 |
| KR | 20120109889 A | * | 10/2012 |

OTHER PUBLICATIONS

English Translation CN-102787981-A (Year: 2012).*
English Translation KR-20120109889-A (Year: 2012).*

*Primary Examiner* — Shafiq Mian
(74) *Attorney, Agent, or Firm* — Timur Slonim; Law Office of Timur E. Slonim, Esq.

(57) ABSTRACT

The system and method for a green integrated electric power plant mounted on rooftops, includes platform on which installed low body and upper body with gap. There are no rotatable parts for generating electric power except the propeller of generator which is affected by three air flows. The generator with propeller placed inside of upper body vertically. Low body has inside tube and spirals. Also low body has a few windows. Each window supplied by tangential plate for creating confined vortex. Thus one wind flow acting through low body directly on propeller, second air flow move warm air flow from source of warm air such as laundry or boiler room of building through conduit, inner tube and multiple Venturi tubes also act as a propeller. Third wind air flow moves perpendicular to vertical axes of generator and goes through gap between low body and upper body directly on propeller.

10 Claims, 13 Drawing Sheets

(56) References Cited

U.S. PATENT DOCUMENTS

2010/0126171 A1* 5/2010 Smith ................... F02C 1/05
 60/644.1
2013/0276447 A1* 10/2013 Chaix ................... F28D 20/00
 60/659

* cited by examiner

A-A

B-B

C-C

D-D

E–E

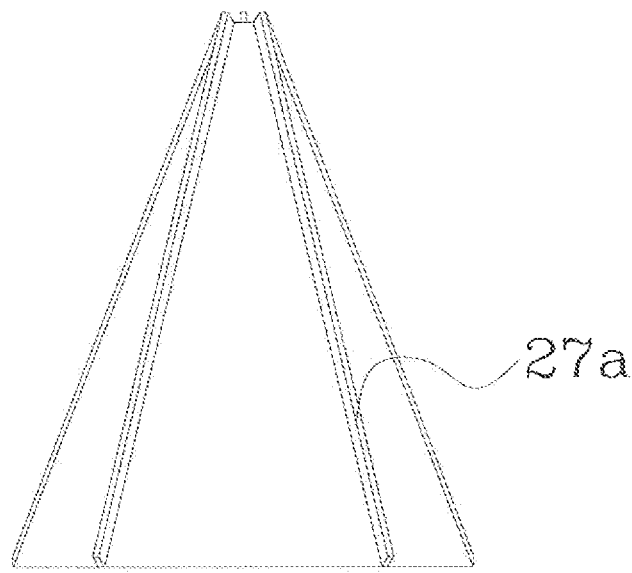
F—F
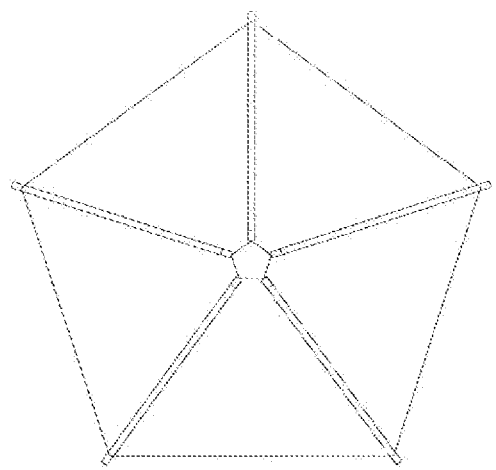
DETAIL 27
FIG. 9

FIG. 11  DETAILS 13a, 13b, 13c, 13d

DETAIL 19

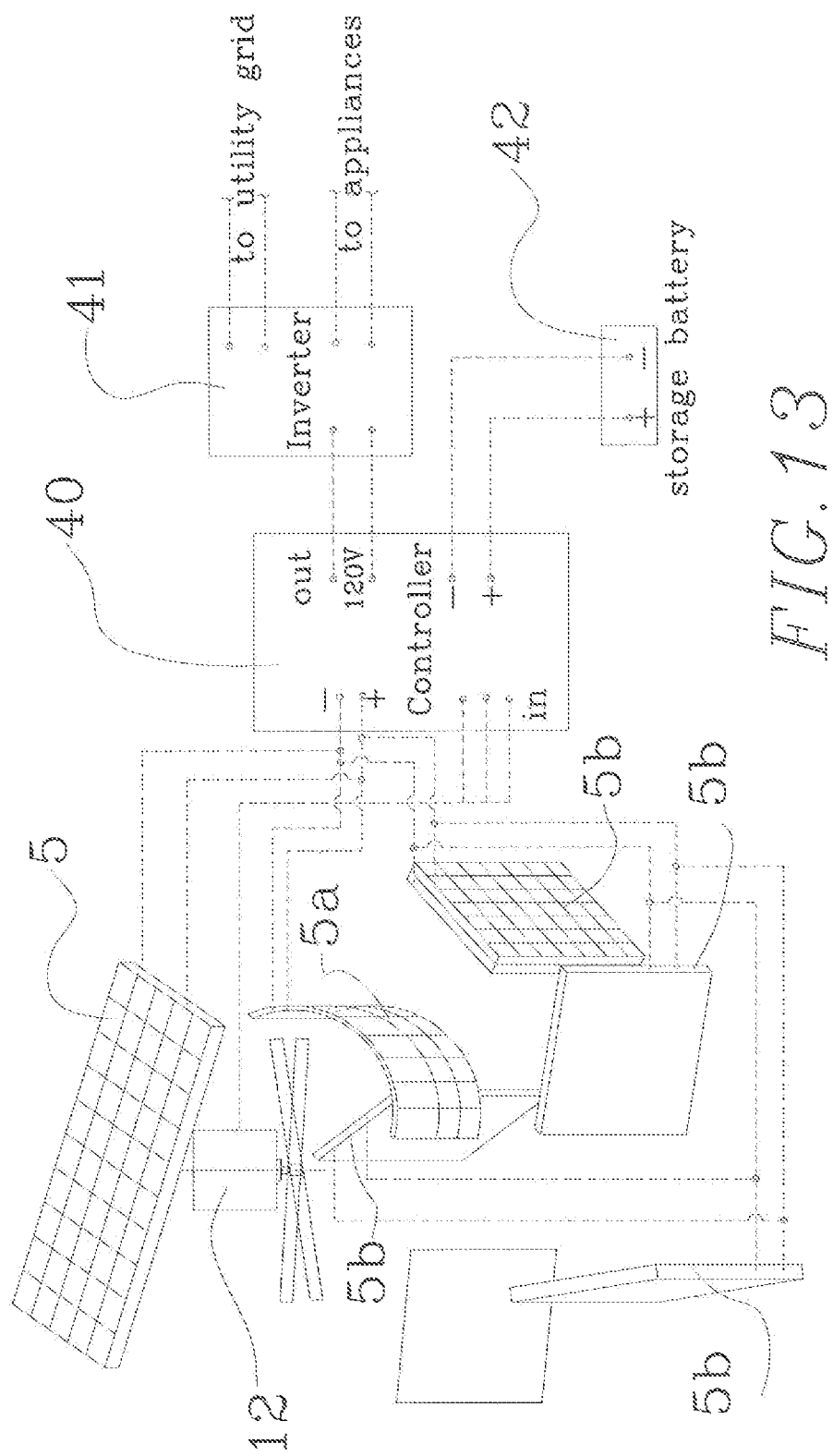

SYSTEM AND METHOD FOR GREEN INTEGRATED ELECTRIC POWER PLANT

FIELD OF THE INVENTION

The present inventions relates generally to wind, solar and convection electric power plant and related power sources.

BACKGROUND OF THE INVENTION

There are a lot of places, where surplus hot air/gas is produced. However, today the surplus hot air/gas is not used and is discharged through conduits into the atmosphere. For example, this can be seen when hot air is discharged from laundry or boiler rooms of buildings, from machine rooms of different ships, and in other places where gas, oil, condensate, etc. are extracted.

The kinetic energy of wind has long been converted into mechanical energy. Many different wind driven devices have been produced and used for converting energy from wind and transforming it into mechanical or electrical power. Such devices tend to be very large, cumbersome, and expensive when compared to the amount of useful work they produce. They have a multitude of very large blades which are directly driven by the relative wind which contacts them, the velocity of which is often so low, that the blades cannot move the load.

Another common type of wind plant is the generally spherical "turbine" type rotor used widely on houses to evacuate hot air from the attic, garages and the boiler room. These rotors have multiple blades set at an angle to catch the wind at one side and deflect the wind at the other side. They are actuated by the wind at its normal velocity and produce so little power that they cannot drive any appreciable load.

A major drawback of the wind plant type devices is that in order to harness enough energy to drive an electric generator, the wind blades and plant have to be excessively large and located in an area of high constant wind. The big size of the open conventional blades results in a constant chopping sound which is distracting and becomes unpleasant and uncomfortable after a short period of time of operation.

To produce useful results wind driven devices should be rapidly responsive to changes in wind direction and velocity. These characteristics are not commonly shared by prior art devices.

Another type of system for the obtaining of energy by means of air/gas flows is a system which is similar to a natural cyclone, which permits production for the whole range of power required by users, its origin being such that it can be installed in any location. This system allows for the artificial reproduction of energy. It consists of confined vortices that have a cyclonic configuration. In this system, kinetic energy originates from wind flows or by taking advantage of the pressure differences existing in the atmosphere as well as the components due to the thermal gradients existing therein.

Usefully, and especially with electricity generating wind driven devices, such devices could integrate a few streams of different gases which originate from separate sources. Examples of gas/air flow powered electrical generators are shown in: U.S. Pat. No. 4,016,725, issued to Edward C. Fiss, discloses a vertical axis wind powered generator. U.S. Pat. No. 4,452,046, issued to Zapata M. Valentin, discloses a system for obtaining of energy by fluid flows resembling a natural cyclone or anticyclone. U.S. Pat. No. 4,508,973, issued to James M. Payne, discloses using efficient Venturi effect to increase the speed of air current directed to the propellers blade of generator. U.S. Pat. No. 7,453,167, issued to Micah Gilbert, discloses two sources of energy—a combination of a wind turbine and a solar energy collector, with additional solar panels mounted vertically on different surfaces of the structure. U.S. Pat. No. 10,876,519, issued to Thomas Chaapel, discloses a set of blades of the rotor assembly which is configured to be rotated due to the air passing through the tower. The generator is configured to convert kinetic energy of the air passing through the tower to an electrical current as the drive shaft is rotated by the set of blades. U.S. Pat. No. 11,015,578, issued to Pamela A. Menges, discloses a wind generator system attached to a structure such as the roof of a building.

SUMMARY OF THE INVENTION

Different embodiments of the system and method of this invention solve these prior art problems by providing an apparatus for electric power generation which could be rooftop mounted and utilizes sun energy, wind power and the convection effect to generate electric current.

Different embodiments of the system and method of this invention present an apparatus for green integrated energy, which generates electric power from solar energy, wind and convection flows. The wind air flow is directed through cyclonic machine along vertical axis and directed perpendicular to the vertical axis, where it combines with convection flow. This design permits for higher degrees of energy concentration. Compared to similar wind driven devices, it requires a lower wind speed, which is needed to start a generator. Wind velocity for an embodiment of the present invention could be approximately 20% lower for a driven generator. This result has been achieved after testing the working model.

One of the elements for the artificial generation of cyclones is having multiple convectors. This includes inlet openings and one baffle plate for each inlet opening, which is tangential to a cylindrical body of cyclone, which generally follows a curved profile in such a way that its presence causes an accelerated air flow, defined by the laws of aerodynamics, compelling natural wind to increase its velocity upon entering in the system.

Another aspect is the possibility to obtain extra energy by using photovoltaic modules to cover some or all surfaces exposed to the sun, e.g., directed to the south, of an apparatus of different embodiments of the present invention.

Cyclonic conversion transforms horizontal energy flow into vertical energy flow, absorbing in the vertical flow other flows originating from other energy sources such as excessive warm air (stack effect) and directing all types and sources of vertical flow exactly to the working area of propeller blades, but not to the root of the blades. A new design of a propeller of different embodiments of the present invention allows utilization of a horizontal flow of wind directly on the propeller.

Various embodiments provide the advantages and features of the integrated electric power plant of the present invention. In one embodiment, the green integrated electric power plant comprises a lower body with an inner tube and a plurality of spirals, an upper body with a generator and a propeller with a plurality of segments mounted on the lower body with a gap and covered by a plurality of photovoltaic panels. In this embodiment, the green integrated electric power plant further comprises a convection flow conduit for directing hot air from a heat source to an inner tube of the lower body and a plurality of Venturi tubes and then to the propeller of the generator. In this embodiment of the green integrated electric power plant, the heat source is hot air from an exhaust of a laundry room or a boiler room. In this embodiment of the green integrated electric power plant, an upper end of the conduit is connected with the inner tube, which comprises a plurality of Venturi tubes, with a upper end of each of the plurality of Venturi tubes bent 135° and a bottom end of each of the plurality of Venturi tubes is connected to a diaphragm. In this embodiment of the green integrated electric power plant, the plurality of segments affixed to a plurality of blades of the propeller cover a propeller sweep area all-around. In this embodiment of the green integrated electric power plant, an outer edge of each of the plurality of segments is bent to meet wind flow. In this embodiment of the green integrated electric power plant, the upper body is placed above the lower body over the gap dimensioned to house the propeller with the plurality of segments in a vertical plane. In this embodiment, the green integrated electric power plant further comprises a low body as a cylinder which has at least five windows and five bearer walls and each of the at least five windows has a tangential plate with a photovoltaic panel base. In this embodiment of the green integrated electric power plant, the five bearer walls between the at least five windows are firm and narrow. In this embodiment of the green integrated electric power plant, the lower body comprises a plurality of spirals equal to the number of the windows and connected to the lower body and the inner tube. In this embodiment of the green integrated electric power plant, the inner tube is connected with the lower body by threaded rods with nuts, which go through a center of the five bearer walls and the inner tube. In this embodiment of the green integrated electric power plant, the upper body comprises a beam from which the generator with the propeller hangs. In this embodiment of the green integrated electric power plant, the upper body has four tube legs which hold at least one photovoltaic panel and base for it, and further comprises a flexible photovoltaic panel which is connected to an outer side of the upper body and is exposed to the south.

Another embodiment provides a green integrated electric power plant utilizing sun light and wind flow comprising a lower body with an inner tube and a plurality of spirals, an upper body with a generator and a propeller mounted on the lower body with a gap and covered by photovoltaic panels. In this embodiment the green integrated electric power plant further comprises a wind guide device in a form of a frustum pyramid with a plurality of ribs and installed between the inner tube of the lower body and a building roof.

Yet another embodiment provides a method of generating electric power by green integrated electric power plant utilizing sun light, wind flow and convection flow (stack effect), installed on a structure, for example, building roof.

BRIEF DESCRIPTION OF THE DRAWINGS

Different embodiments of the present invention can be readily understood by considering the following detailed description in conjunction with the accompanying drawings of the various embodiments of the invention, in which:

FIG. 9 has schematic views of a wind guide device;

FIG. 13 is a connection diagram of wind generator, solar panels with wind and solar power hybrid controller and inverter.

DETAILED DESCRIPTION OF THE INVENTION

Figure 1:
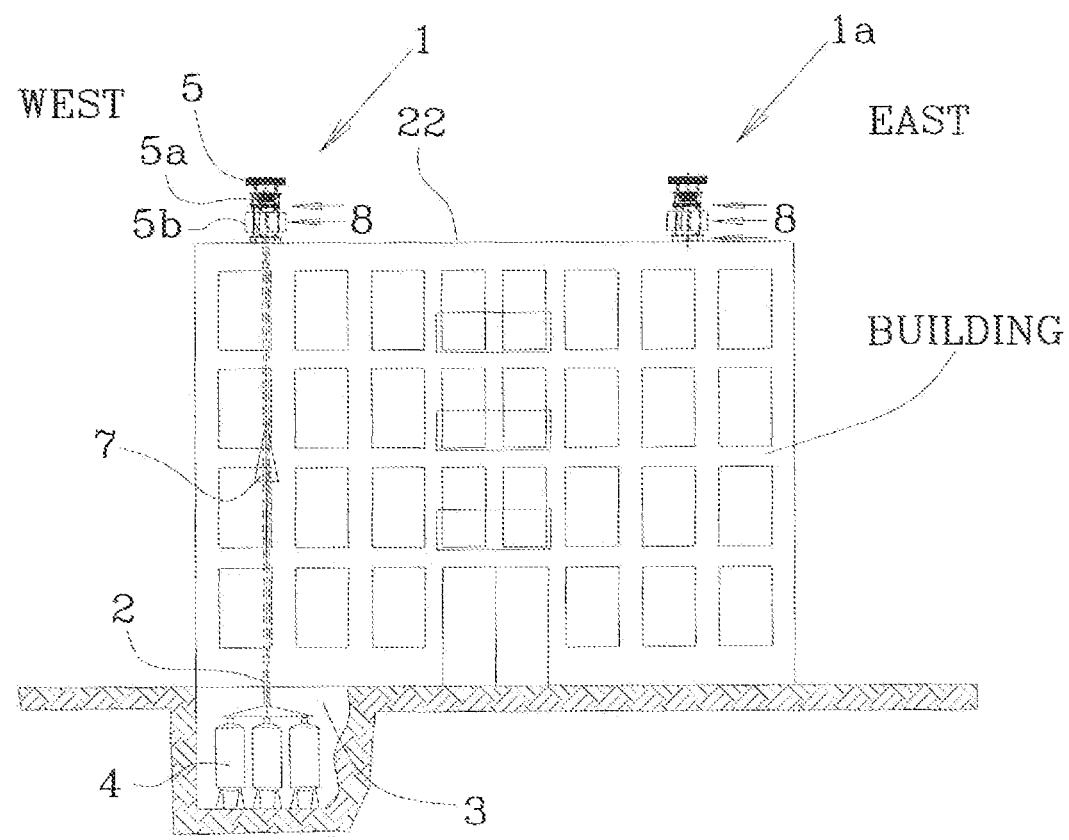
FIG. 1 schematically shows two embodiments of an integrated electric power plant installed on the roof of a building.

Referring to FIG. 1, an embodiment of an integrated electric power plant 1 of the present invention is schematically shown. It is mounted on a building roof 22. The electric power plant 1 comprises a hot air conduit 2, which rises from an energy source, such as producing excessive warm air/gas in a boiler room 3 from one or more boilers 4. The electric power plant 1 also comprises a photovoltaic panel 5, which is installed on top of it and cover it, also all vertical surfaces comprises photovoltaic panels 5a, 5b. An arrow 7 shows hot air flow direction and an arrows 8 shows wind flow directions. Another embodiment of an integrated electric power plant 1a of the present invention is also schematically shown.

Figure 2:
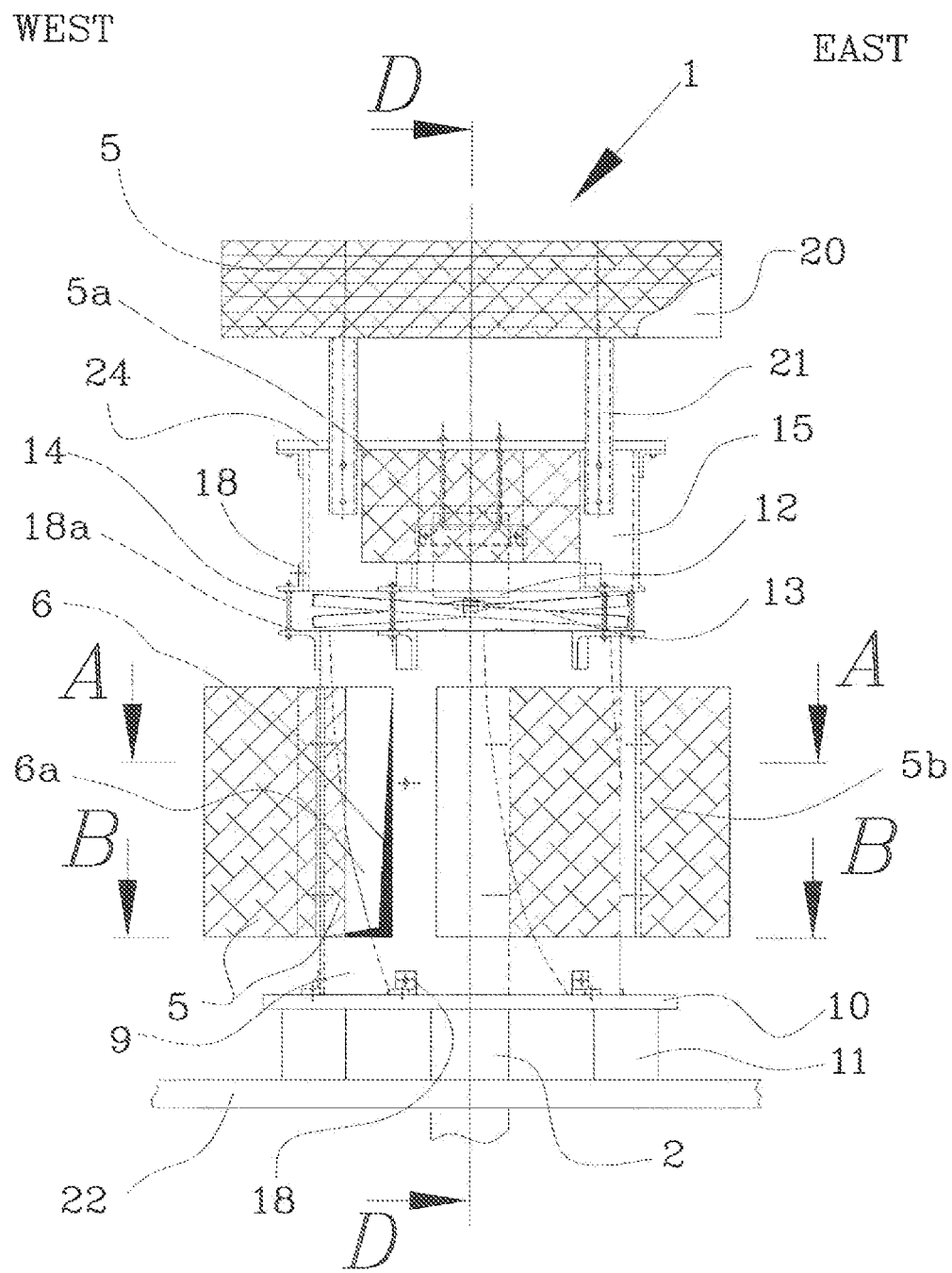
FIG. 2 is a schematic frontal view of a first embodiment of an integrated electric power plant, which uses the convectional effect.

Referring to FIG. 2, the electric power plant 1 comprises a lower body 9, which has been installed on a platform 10, whose legs 11 are placed on the building roof 22. An upper body 15 has been installed on the lower body 9 by flanges 18, brackets 18a and a spacer 14. The upper body 15 has set a beam 24 from which a generator 12, with propeller blades 13 and segments 13a, is hanging down. A photovoltaic panel base 20 and the photovoltaic panel 5 are connected to the upper body 15 by four pipe legs 21. The photovoltaic panels 5 to be exposed maximum time to the sun, e.g. to the south. The hot air conduit 2 goes from boiler room of building to bottom of inner tube 23 (depicted in sectional view D-D in FIG. 7) of low body 9. The lower body 9 has a plurality of windows 6, for example five, and between the lower body 9 and the inner tube 23 has installed spirals 6a. The number of spirals 6a equals the number of windows 6.

Figure 3:
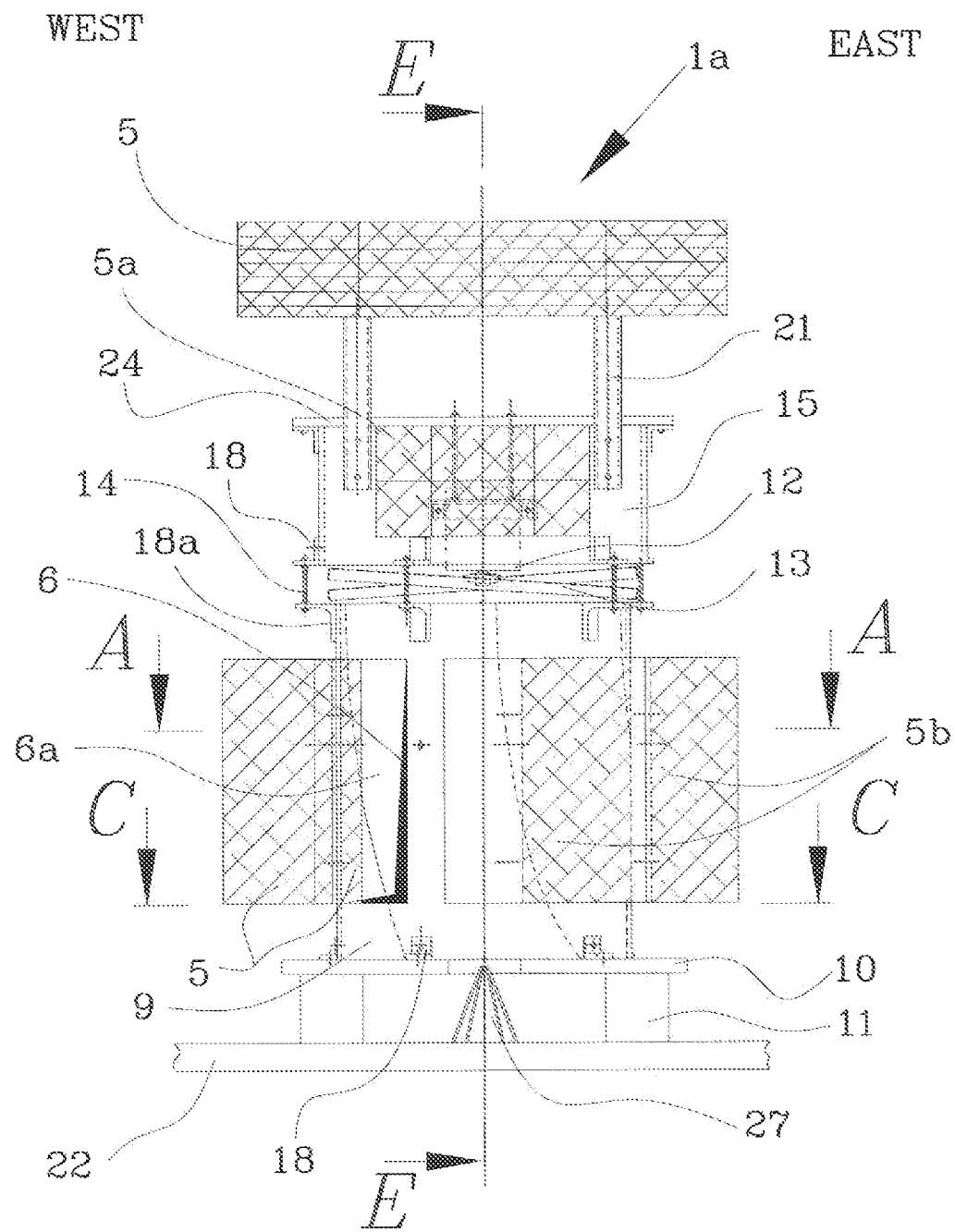
FIG. 3 is a schematic frontal view of a second embodiment of an integrated electric power plant, which uses an additional air flow instead of the convectional effect.

Referring to FIG. 3, the integrated electric power plant 1a is schematically depicted with the same details as in FIG. 2. Except that instead of the hot air conduit 2, which goes up to the platform 10 or to the bottom of the lower body 9, a wind guide device 27 is installed between the building roof 22 and the platform 10.

Figure 4:
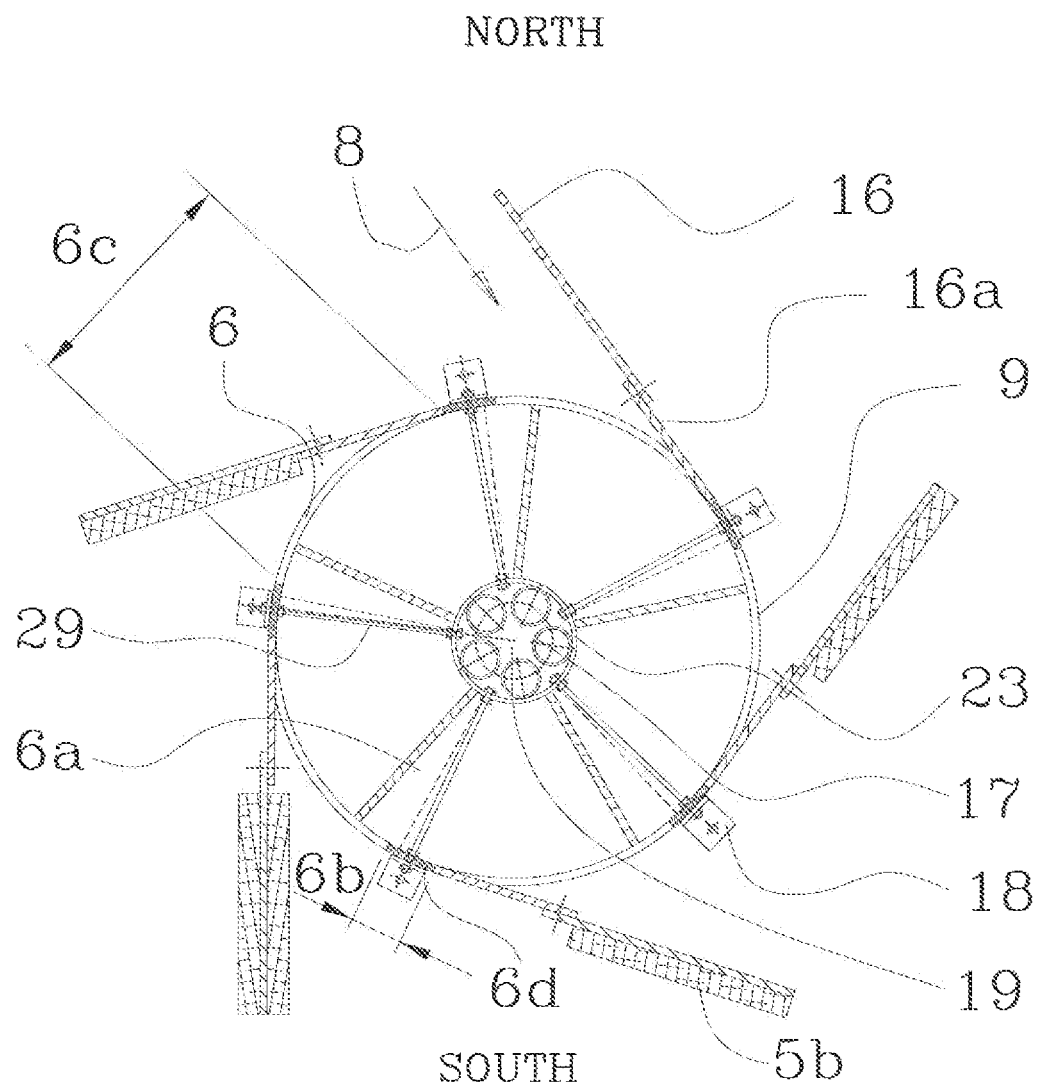
FIG. 4 is a cross sectional view of the first and second embodiments of an integrated electric power plant taken along the line A-A in FIG. 2 and FIG. 3.

Referring to FIG. 4, a cross sectional view of the integrated electric power plants 1 and 1a taken along the line A-A in FIG. 2 and FIG. 3 is shown. FIG. 4 shows the lower body 9, constructed as a tube with, for example, five of the windows 6, whose chord is marked as 6c. The lower body 9 comprises a bearer wall 6d whose chord is marked 6b. The lower body 9 also comprises five tangential plates 16a with five a photovoltaic panels base 16 and the photovoltaic panels 5b. Inside the lower body 9 is the inner tube 23 which contains five of a Venturi tube 17 and a diaphragm 19. The inner tube 23 is connected with the lower body 9 by two levels of braces (or threaded rods) 29 and nuts. The photovoltaic panels 5b to be exposed maximum time to the sun, e.g. to the south and installed on the five tangential plates 16a.

The arrow 8 shows the wind flow direction. There are five flanges 18 for fixing the lower body 9 to the platform 10 which enables the slope of the upper photovoltaic panel 5 to be exposed maximum time to the sun, e.g., to the south. Between the lower body 9 and the inner tube 23 five spirals 6a are placed.

Figure 5:
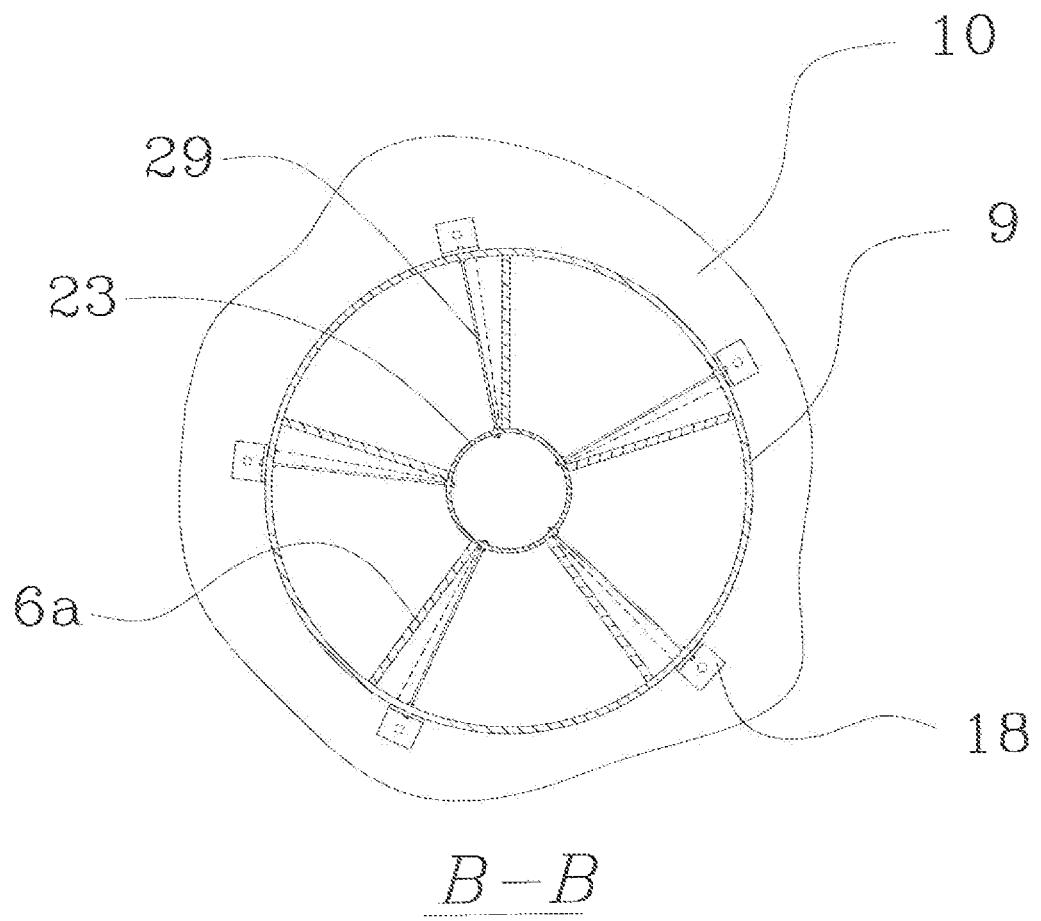
FIG. 5 is a cross sectional view of the first embodiment of an integrated electric power plant taken along line B-B in FIG. 2.

Referring to FIG. 5, a cross sectional view of the integrated electric power plant 1 taken along the line B-B in FIG. 2 is shown, with the spirals 6a, the lower body 9, the platform 10, the flange 18, the inner tube 23, and the braces (or threaded rods) 29.

Figure 6:
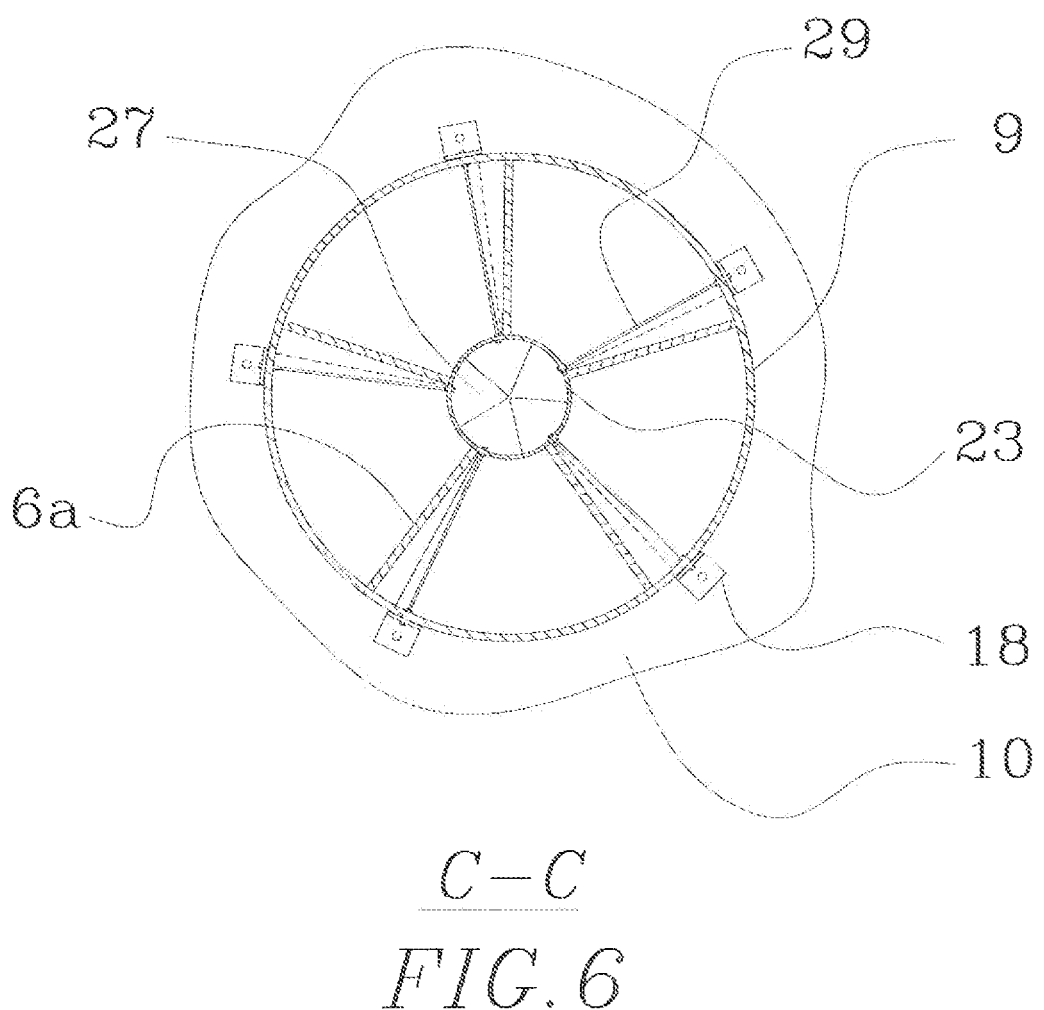
FIG. 6 is a cross sectional view of the second embodiment of an integrated electric power plant taken along line C-C in FIG. 3.

Referring to FIG. 6, a cross sectional view of the integrated electric power plant 1a taken along line C-C in FIG. 3 is shown, with the spirals 6a, the lower body 9, the platform 10, the flange 18, the inner tube 23, the wind guide device 27, and the braces (or threaded rods) 29.

Figure 7:
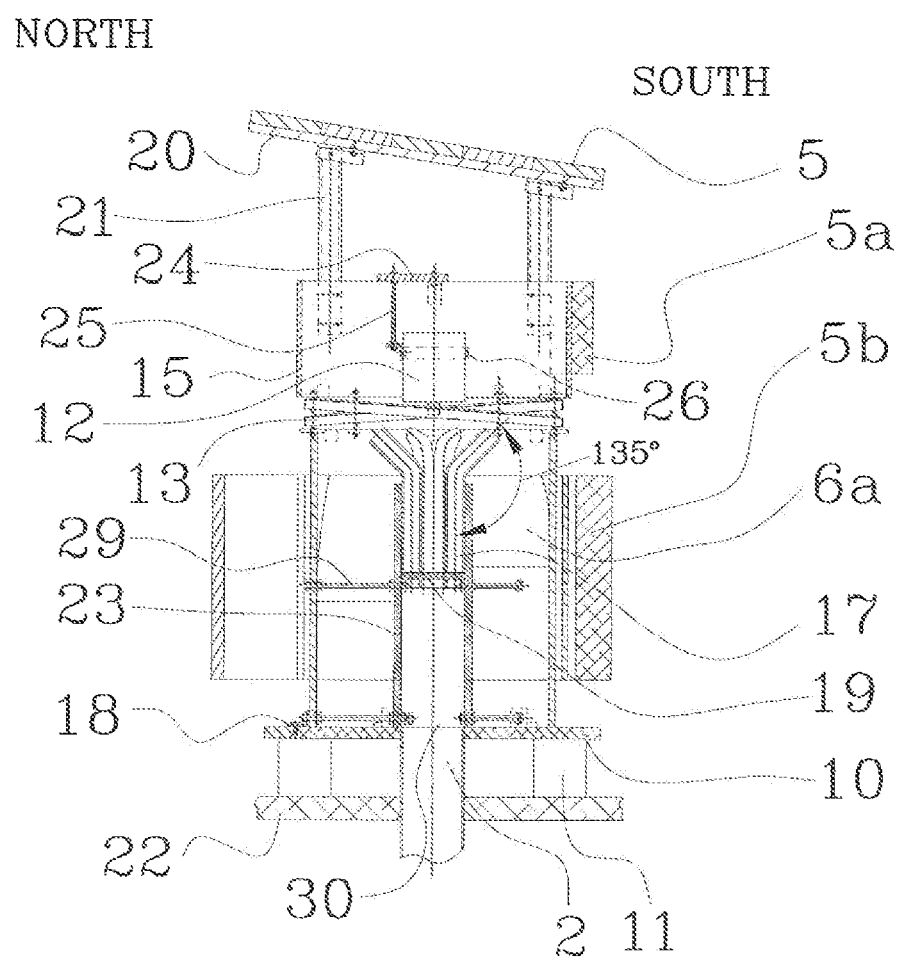
FIG. 7 is a cross sectional view of the first embodiment of an integrated electric power plant taken along line D-D in FIG. 2.

Referring to FIG. 7, a cross sectional view of the integrated electric power plant 1 taken along line D-D in FIG. 2 is shown, comprising photovoltaic panels 5, 5a, 5b of different sizes and forms, the spirals 6a, the platform 10, the platform legs 11, the hot air conduit 2, the generator 12, the Venturi tubes 17, the diaphragm 19, the flange 18, the propeller blades 13 with the segments 13a, the upper body 15, the photovoltaic panel base 20, the pipe legs 21, the building roof 22, the beam 24, the two lifting adjustable rods 25, the set collar 26, the inner tube 23, the brace (threaded rod) 29, a joint line 30 of the inner tube 23 and the hot air conduit 2. Preferably upper part of the Venturi tubes 17 is bent to 135°. Other angles could be utilized as well.

Figure 8:
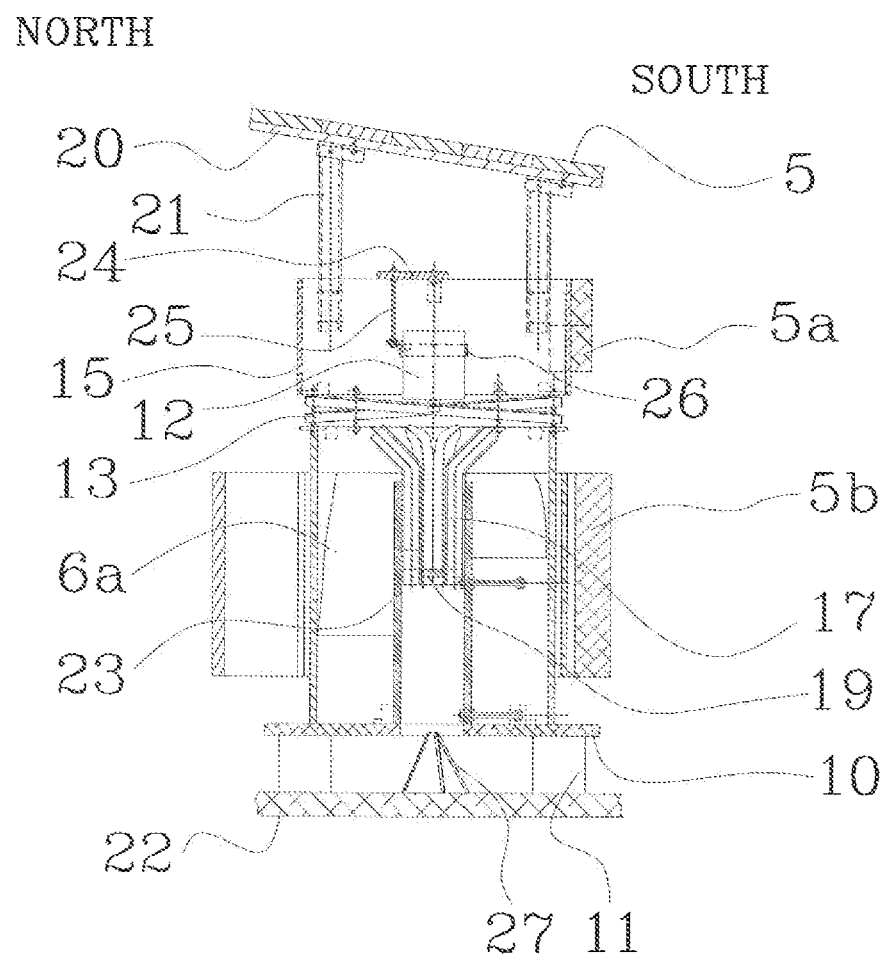
FIG. 8 is a cross sectional view of the second embodiment of an integrated electric power plant taken along line E-E in FIG. 3.
Figure 10:
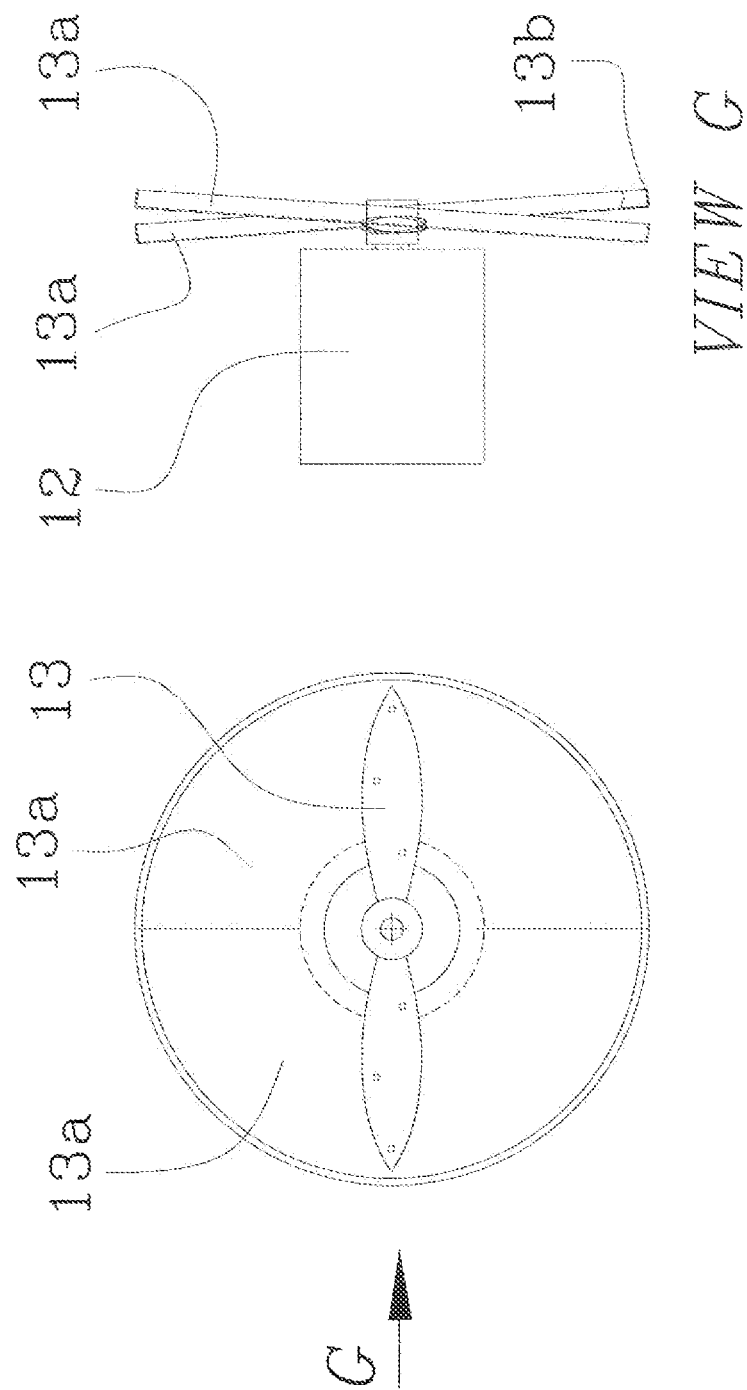
FIG. 10 has schematic views of an assembly of a generator, propeller blades, and segments with bent edge.

Referring to FIG. 8, a cross sectional view of the integrated electric power plant 1a taken along line E-E in FIG. 3 is shown, comprising photovoltaic panels 5, 5a, 5b of different sizes and forms, the spirals 6a, the platform 10, the platform legs 11, the generator 12, the propeller blades 13 with the segments 13a(see FIG. 10), the upper body 15, the Venturi tubes 17, the diaphragm 19, the photovoltaic panel base 20, the pipe legs 21, the building roof 22, the inner tube 23, the beam 24, the two lifting adjustable threaded rods 25, the wind guide device 27, the set collar 26 which holds the generator 12 with propeller blades 13 and segments 13a (see FIG. 10).

Referring to FIG. 9, the wind guide device 27 is shown in detail. The wind guide device 27 has a form of the frustum of a pyramid with ribs 27a.

Referring to FIG. 10, the generator 12 is shown with the propeller blades 13 and the segments 13a, having the bent edges 13b.

Figure 11:
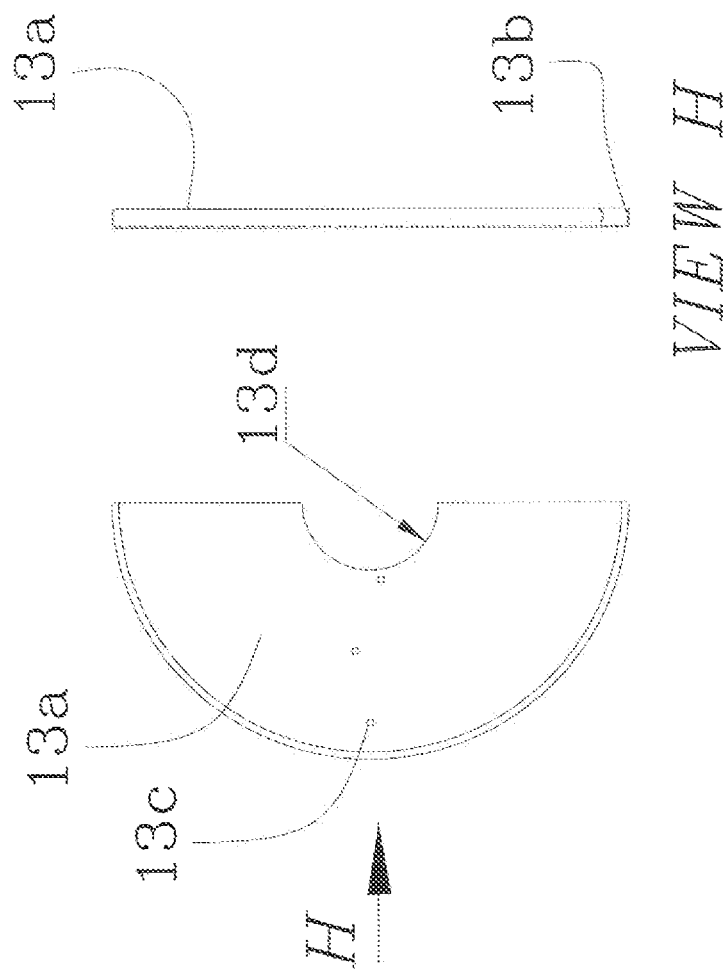
FIG. 11 has schematic views of segment 13 with different elements of segment 13b, 13c, 13d.

Referring to FIG. 11, the segment 13a is shown in detail, with the bended edge 13b, the holes 13c for fixing the segment 13a to the propeller blade, the inner radius 13d of segment 13a which equals half the diameter of the inner tube 23.

Figure 12:
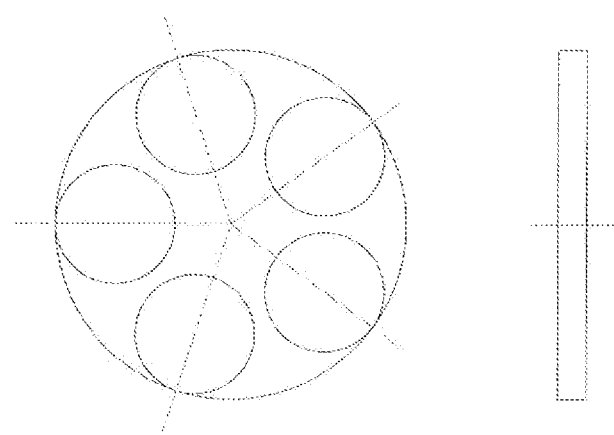
FIG. 12 is a schematic view of a diaphragm.

Referring to FIG. 12, the diaphragm 19 is shown in detail, with the plate with holes for fixing a plurality of the Venturi tubes 17.

Referring to FIG. 13, it presents a connection diagram of the wind generator 12, photovoltaic panels 5, 5a, 5b with a controller 40, an inverter 41 and a storage battery 42.

Some of the main advantages of using the green integrated electric power plant include:

1. In both embodiments no rotating parts except the propeller which placed inside the upper body what is more safety for people and birds and longer time could be use without any kind of maintenance.
2. The both embodiments allow receive more energy as wind speed lower on 20% as compared with indication by manufacturer of generator.
3. The green integrated electric power plant doesn't use burning any fossil and using Nuclear Reaction.

Two embodiments of green integrated electric power plant provide possibilities to use all free square of roof of building for receiving maximum energy.

First embodiment of green integrated electric power plant could be installed only as a continuation of conduit of hot air from source of hot air (laundry or boiler room).

Second embodiment of green integrated electric power plant could be installed everywhere on the roof of building e.g. as many, as allowed free square of roof of building.

It will be understood by those skilled in the art that each of the elements described above and their various combinations may also find a useful application in other types of constructions differing from the embodiments described above.

While the invention has been illustrated and described above, it is not intended to be limited to the details shown, since various modification and structural changes may be made without departing in any way from the spirit of the present invention.

What is claimed as new and desired to be protected by Letters Patent is set forth in the appended claims.

I claim:

1. A green integrated electric power plant comprising a lower body with an inner tube and a plurality of spirals, an upper body with a generator and a propeller with a plurality of segments mounted on the lower body with a gap and covered by a plurality of photovoltaic panels, a convection flow conduit for directing hot air from a heat source to an inner tube of the lower body and then to the propeller of the generator, wherein an upper end of the conduit is connected with the inner tube, comprising a plurality of venturi tubes, with an upper end of each of the plurality of venturi tubes bent 135° and a bottom end of each of the plurality of venturi tubes is connected to a diaphragm.

2. A green integrated electric power plant comprising a lower body with an inner tube and a plurality of spirals, an upper body with a generator and a propeller with a plurality of segments mounted on the lower body with a gap and covered by a plurality of photovoltaic panels, wherein the plurality of segments affixed to a plurality of blades of the propeller cover a propeller sweep area all-around.

3. The green integrated electric power plant of claim 2 wherein an outer edge of each of the plurality of segments is bent to meet wind flow.

4. A green integrated electric power plant comprising a lower body with an inner tube and a plurality of spirals, an upper body with a generator and a propeller with a plurality of segments mounted on the lower body with a gap and covered by a plurality of photovoltaic panels, wherein the upper body is placed above the lower body over the gap dimensioned to house the propeller with the plurality of segments in a vertical plane.

5. A green integrated electric power plant comprising a lower body with an inner tube and a plurality of spirals, an upper body with a generator and a propeller with a plurality of segments mounted on the lower body with a gap and covered by a plurality of photovoltaic panels, further comprising a low body as a cylinder which has at least five windows and five bearer walls and each of the at least five windows has a tangential plate with a photovoltaic panel base.

6. The green integrated electric power plant of claim 5 wherein the five bearer walls between the at least five windows are firm and narrow.

7. A green integrated electric power plant comprising a lower body with an inner tube and a plurality of spirals, an upper body with a generator and a propeller with a plurality of segments mounted on the lower body with a gap and covered by a plurality of photovoltaic panels, wherein the lower body comprises a plurality of spirals equal to the number of the windows and connected to the lower body and the inner tube.

8. A green integrated electric power plant comprising a lower body with an inner tube and a plurality of spirals, an upper body with a generator and a propeller with a plurality of segments mounted on the lower body with a gap and covered by a plurality of photovoltaic panels, wherein the inner tube is connected with the lower body by threaded rods with nuts, which go through a center of the five bearer walls and the inner tube.

9. A green integrated electric power plant comprising a lower body with an inner tube and a plurality of spirals, an upper body with a generator and a propeller with a plurality of segments mounted on the lower body with a gap and covered by a plurality of photovoltaic panels, wherein the upper body comprises a beam from which the generator with the propeller hangs and wherein the upper body has four tube legs which hold at least one photovoltaic panel and base for it, and further comprises a flexible photovoltaic panel which is connected to an outer side of the upper body and is exposed to the south.

10. A green integrated electric power plant utilizing sun light and wind flow comprising a lower body with an inner tube and a plurality of spirals, an upper body with a generator and a propeller mounted on the lower body with a gap and covered by photovoltaic panels and a wind guide device in a form of a frustum pyramid with a plurality of ribs and installed between the inner tube of the lower body and a building roof.

* * * * *